Figure 1:
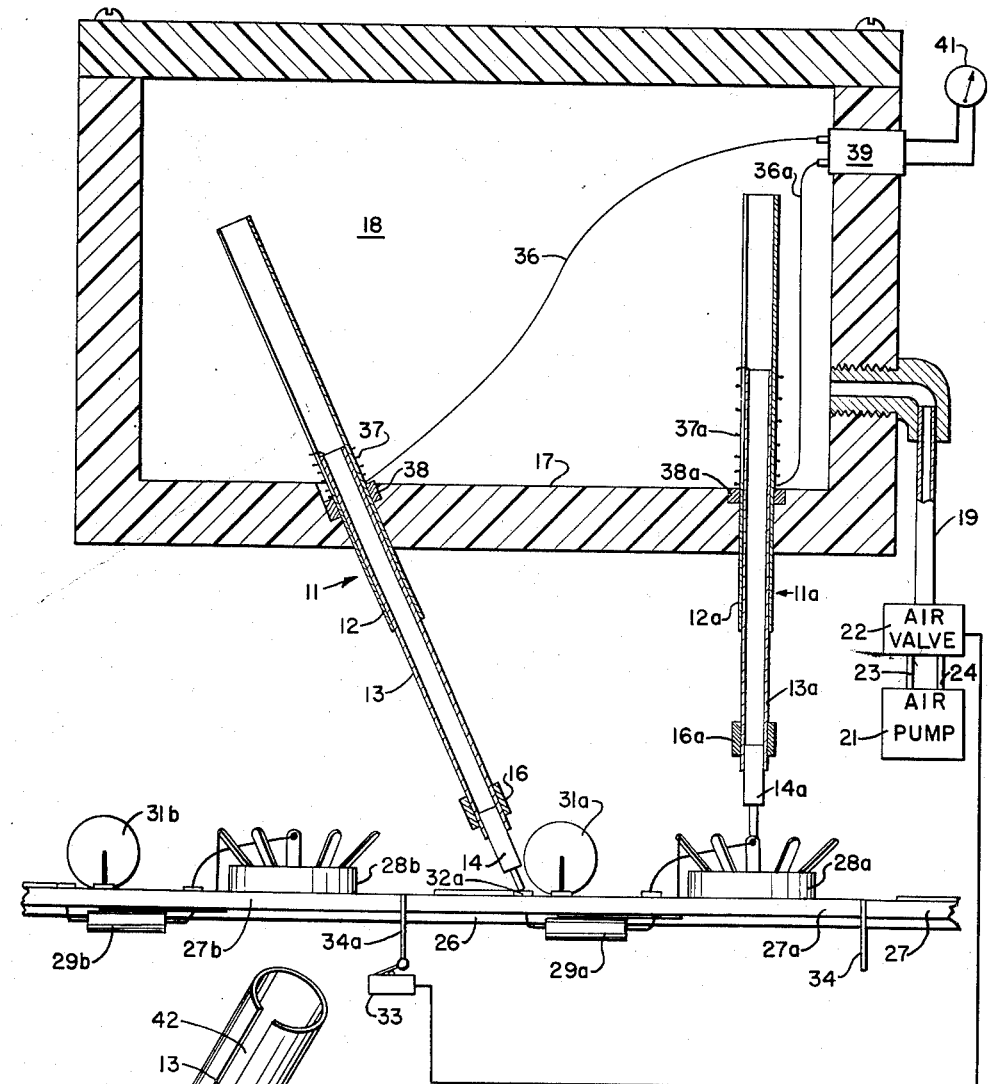

Sept. 27, 1960     K. R. McKEE     2,954,521

AIR-ACTUATED ELECTRICAL CONTACT PROBE

Filed April 23, 1958

INVENTOR.
KENNETH R. MC KEE
BY
AGENT

United States Patent Office 2,954,521
Patented Sept. 27, 1960

2,954,521
AIR-ACTUATED ELECTRICAL CONTACT PROBE

Kenneth R. McKee, Pomona, Calif., assignor to Technical Electronics Corporation, Culver City, Calif., a corporation of California Filed Apr. 23, 1958, Ser. No. 730,378

5 Claims. (Cl. 324—72.5)

This invention relates to electrical probes for making contact with electrical circuit terminals. In particular, the invention is directed to a combined system consisting of air-operated probes and associated apparatus to extend and retract the probes by means of air pressure, so as to cause the probes to make contact with electrical connections in a piece of electrical apparatus.

The invention comprises a probe consisting of a cylinder and piston, enclosed within but extending through the wall of a relatively gas-tight chamber. An air supply is connected to the chamber to control the pressure therein so as to push the piston out of or pull it back into the cylinder. At the outer end of the piston is an electrical contact member suitable for making contact with points of an electrical circuit or device. An electrical connection, at least part of which is inside of the closed chamber, connects with the internal end of the piston and in turn is connected to other electrical apparatus to make use of the information obtained when the piston is extended into contact with the circuit or apparatus to be tested.

One of the objects of this invention is to provide an improved electrical probe and particularly to provide a probe which can be operated by air to provide uniform contact pressure for contact points of different height. Another object is to provide a probe of the sort just described which is particularly suited for mass production testing and especially for testing printed electrical circuits.

Figure 2:
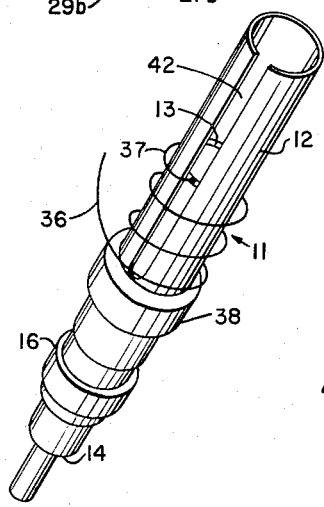

Other objects will become apparent from the following specification together with the drawing in which:

Fig. 1 is a cross sectional view of an air-actuated probe constructed according to the invention with part of the apparatus shown in schematic form; and Fig. 2 is a perspective view of one of the probes in Fig. 1.

The apparatus in Fig. 1 comprises a pair of electrical probes 11 and 11a each having a cylinder 12 and a piston 13 of slightly smaller cross sectional area than the cylinder so as to slide easier therein. The piston 13 as shown in this embodiment consists of a hollow cylinder but could as easily be made of solid material. In the present form piston 13 is closed at one end by means of a conductive member 14. A band 16 serves as a stop to prevent the piston from being retracted too far inside of the cylinder 12.

The cylinders 12 and 12a extend through one wall 17 of an enclosed chamber 18 and are preferably sealed into the wall 17 by gas-tight seals. The chamber 18 is connected by means of a gas supply pipe 19 to a gas source 21 such as an air pump. Preferably the pump is provided with an air valve 22 connected by means of one pipe 23 to the high pressure side of pump 21 and by means of a second pipe 24 to the vacuum side of pump 21 so that chamber 18 can be supplied at will with high pressure air so as to force the pistons 13 to move downward or can be partially evacuated to draw the pistons back up into the cylinders 12.

In the embodiment shown in Fig. 1, the chamber 18 is suspended over a conveyer track 26 which carries, in this instance, a succession of insulating members 27 on which electrical circuits have been printed and electrical components mounted. These components include a vacuum tube socket 28, a resistor 29, and a condenser 31. The resistor 29 is connected by means of conductive printed circuit leads extending through the insulating member 27 to one of the terminals of the socket 28 and to another connection point 32 located partially under the condenser 31. A micro-switch 33 is located under the track 26 and is actuated by separators 34 to control the air valve 22 to retract the pistons 13 during periods when one of the boards 27 is being moved to the right and the next board 27a is being moved into place under the chamber 18. In the position shown in Fig. 1 the switch 33 is actuated by the separator 34a to operate the air valve 22 so as to connect the high pressure line 23 to the supply line 19 in order to extend the pistons 13. Due to the limited accessibility of the terminals 32 which are located partially under the condensers 31, it is necessary to place probe 11 at an acute angle to the wall 17 instead of making it parallel to the other probe 11a. However, because of the fact that the same air pressure is applied to all of the pistons 13, it makes no difference whether the probes 11 are parallel to each other or not, nor does it matter that one of the pistons 13 must extend further than the other piston 13a before making contact with the desired circuit point. It is this adaptability that makes the present invention useful in testing all sorts of electrical apparatus and not just printed circuits.

Once physical contact has been made by the members 14 to the circuit points which happen, in this instance, to be the two terminals of resistor 29a, the quality of connections in the printed circuit and other electrical chambers of the printed circuit may be tested by applying electrical signals to or taking electrical signals from the probes 11. This is done by electrical connection means consisting of wire leads 36 and thin helical wire leads 37 which loosely encircle the cylinders 12 and are preferably connected to the inner ends of pistons 13 so as to move therewith. The other ends of the helical wires 37 may be attached to a conductive ring 38 encircling the cylinders 12. The leads 36 may be connected to an electrical receptacle 39, and other electrical apparatus, such as a voltmeter 41, may be plugged into the receptacle 39 from outside of the chamber 18.

Fig. 2 shows another view of probe 11 to illustrate the mode of connection of the helical wire 37. This wire is wound loosely about the cylinder 12 and, in fact, need not even touch the cylinder. As a convenient mounting for the wire 37, a conductive ring 38 may be placed around the cylinder 12 and the wire 37 soldered or welded thereto. As shown, the lead 36 may also be soldered or welded to the same ring 38. The cylinder 12 is provided with a slot 42 through which the wire 37 extends so as to make contact with the end of the piston 13. It is possible to provide sufficient slack in the wire 37 to loop it over the top of cylinder 12 without making use of a slot, but the advantage of the slot is that the wire 37 may be held within the near vicinity of the cylinder without flopping loosely about, and in this way a number of probes 11 can be placed in close proximity without danger that the wires 37 of adjacent probes will make contact with each other.

While it is possible to use the wire 37 as a retracting spring to retract piston 13 up into the cylinder 12, the use of a partial vacuum to effect the retraction has the advantage that there would be no spring pressure to be overcome in extending the piston, and thus, the pressure of the member 14 on the circuit point to be tested would be substantially dependent only on the air pressure within the chamber 13, no matter whether the piston 13 had to extend out of the cylinder 12 by a relatively small distance or a relatively large distance. Although, it may be desirable to make both the cylinder 12 and the piston 13 out of hardened steel so as to prevent wear, it is not advisable to rely on the contact between the piston and cylinder as part of the electrical connection for the reason that the piston 13 tends to ride on a cushion of air and may be suspended entirely free of the cylinder 12 even though the piston has only a very small clearance in the bore of the cylinder.

While the invention has been described in terms of specific embodiment, it will be understood by these skilled in the art that many modifications may be made therein within the scope of the following claims.

What is claimed is:

1. In combination, a hollow cylinder; a conductive piston located within said cylinder and having a slightly smaller external cross-section than the internal cross-section of said cylinder so as to slide easily therein; a closed chamber having an aperture in the wall thereof, said cylinder extending through said aperture; a source of compressed air; means for producing a partial vacuum; a valve connecting said source and said means to said chamber, said valve being adjustable to connect said source and said means alternately whereby, when said source of compressed air is connected to said chamber, said piston is forced to move outward and when said means for producing a partial vacuum is connected to said chamber, said piston is forced to move inward; electrically responsive apparatus; and electrical circuit means within said chamber comprising a flexible electrical conducter, one end of which is connected to said piston to move therewith and the other end of which is fixedly mechanically held with respect to said cylinder and electrically connected to said electrically responsive apparatus.

2. A testing device comprising a gas-tight chamber; a supply of compressed air; a vacuum pump; a valve having a first input connected to said source of compressed air and a second input connected to said vacuum pump; a connection between said valve and said chamber whereby said chamber may be alternately filled with compressed air and partially evacuated; a plurality of probes, each comprising a cylinder extending through the wall of said chamber and sealed thereto, a piston within each said cylinder and freely slidable therein in response to the pressure of air within said chamber; all of said pistons being retracted into said cylinders when said chamber is connected to said vacuum pump, a longitudinal slot in each said cylinder in the portion thereof inside said chamber, a flexible helical conductor surrounding each said cylinder and having one end extending through said slot and attached to the piston in said cylinder; a conveyor track supporting a plurality of successive substantially identical electrical units; and electrical switch connected to said valve to control the operation thereof, said switch being actuated in response to the position of said units on said track whereby as each unit reaches a predetermined location on said track, said switch is actuated and said chamber is commnected to said source of compressed air to extend said pistons into contact with contact points on one of said units, said switch being subsequently reversely actuated to connect said chamber to said vacuum pump to cause said pistons to be retracted when said unit moves beyond said location.

3. The probe of claim 4 in which said helical conductor exerts negligible force on the movement of said piston in said cylinder.

4. A probe comprising a cylinder and a piston movable therein and having a slightly smaller external cross-section than the internal cross-section of said cylinder; a fluid-tight chamber enclosing one end of said cylinder and sealed to said cylinder in a region intermediate the ends of the latter; fluid pressure means connected to said chamber for moving said piston back and forth; one end of said piston extending out of said cylinder when pressure is increased in said chamber to form a probe contact means; a slot in the wall of said cylinder within said chamber and extending along the path of travel of the opposite end of said piston; a flexible helical conductive member surrounding said cylinder, one end of said helical member extending through said slot and being electrically connected to said piston, and the other end of said helical member being mechanically affixed to a point stationary with respect to said cylinder and clear of that section of said slot traversed by said one end of said helical member as said piston moves in normal operation.

5. A probe comprising a cylinder and a piston partially inserted therein having a slightly smaller external cross-section than the internal cross-section of said cylinder; fluid pressure means connected to said cylinder for moving said piston back and forth; one end of said piston extending out of said cylinder to form a probe contact means; a longitudinal slot in the wall of said cylinder adjacent the path of travel of the inserted end of said piston; a projection forming a shoulder about said cylinder at the end of said slot remote from said inserted end of said piston; a flexible helical conductive member surrounding said cylinder within the circumferential confines of said shoulder and extending from a point adjacent said shoulder towards said inserted end of said piston; the end of said helical member remote from said shoulder extending through said slot and being electrically connected to said inserted end of said piston; and an elongated lead being electrically connected to the other end of said helical conductive member which is disposed adjacent said shoulder to maintain said elongated lead substantially stationary as said piston is extended and retracted.

References Cited in the file of this patent

UNITED STATES PATENTS

| | | |
|---|---|---|
| 2,654,075 | Gaborc | Sept. 29, 1953 |
| 2,685,060 | Pierce et al. | July 27, 1954 |
| 2,844,250 | Bayha et al. | July 22, 1958 |